United States Patent [19]

Wahls et al.

[11] Patent Number: 4,709,896
[45] Date of Patent: Dec. 1, 1987

[54] IN-SEAT SUSPENSION

[75] Inventors: Robert Wahls, Leclaire, Iowa; Dennis Gryp, Silvis, Ill.

[73] Assignee: Sears Manufacturing Co., Davenport, Iowa

[21] Appl. No.: 793,084

[22] Filed: Oct. 30, 1985

[51] Int. Cl.⁴ .............................................. A47C 3/00
[52] U.S. Cl. ................... 248/550; 248/592; 248/598; 248/631
[58] Field of Search ............... 248/550, 592, 594, 596, 248/598, 631; 297/307

[56] References Cited

U.S. PATENT DOCUMENTS

| 2,503,796 | 4/1950 | Bruhn | 248/594 |
| 2,685,913 | 8/1954 | Schlueter | 248/592 |
| 2,961,033 | 11/1960 | Galbraith | 248/596 |
| 3,298,654 | 1/1967 | Dome | 248/631 |
| 3,325,136 | 6/1967 | Radke et al. | 248/550 |
| 3,341,165 | 9/1967 | Taylor | 248/550 |
| 3,999,800 | 12/1976 | Penzotti | 248/550 |
| 4,213,594 | 7/1980 | Pietsch et al. | 248/550 |
| 4,264,050 | 4/1981 | Wahls | 248/550 |

FOREIGN PATENT DOCUMENTS 138795 9/1950 Australia .............................. 248/596

Primary Examiner—Richard J. Scanlan, Jr.
Assistant Examiner—Anthony Knight
Attorney, Agent, or Firm—Niro, Scavone, Haller & Niro

[57] ABSTRACT

The invention is a suspension system for a vehicle seat with structural features allowing the suspension to be contained within the confined space available in recreational vehicles and light trucks. The invention includes a generally horizontal moveable platform pivotally attached at one end to a side of a seat frame. An air spring and shock absorber are mounted between the frame and the bottom of the seat to resiliently bias and damp the platform and therefore the occupant's vertical movement. The pivotal attachment is as far as possible from the center of the seat to permit maximum movement of the platform in an arc which closely approximates a straight, substantially vertical line. Means for automatically adjusting the suspension for occupants of different weights is included.

11 Claims, 7 Drawing Figures

IN-SEAT SUSPENSION

BACKGROUND OF THE INVENTION

The invention is directed to a suspension system for a vehicle seat.

Any vehicle seat requires some apparatus to absorb shocks transmitted through the vehicle wheels and suspension system to the passenger compartment. Large vehicles such as tractor-trailers and agricultural vehicles employ elaborate seat suspension systems for the driver and passenger seats to absorb shocks and damp vibration of the seat near its natural frequency. The absorption and dampling features minimize the discomfort to the operator of the vehicle and its passengers; thus the driver can operate a vehicle for a longer period of time in greater comfort and without tiring. Because of the space available in the passenger compartments of large vehicles, and because of the relatively high cost of such vehicles, the seat suspension systems are frequently complex, bulky and expensive. See, for example, Radke et al., U.S. Pat. No. 3,325,136. The parallelogram mechanism depicted there requires substantial vertical space, rendering the device less useful in smaller vehicles.

Lower cost vehicles, such as vans, pickup trucks, motor homes and fourwheel-drive vehicles have traditionally employed seat suspensions incorporating only lightweight springs to minimize cost and complexity, and because of the limited space available in such vehicles. Because these vehicles may also be used off of roads, their suspension systems are quite stiff. This insures that the suspension will not bottom out when the vehicle is driven on a rough surface. However, still suspension systems are inherently disadvantageous when an offroad vehicle is driven on a highway, because they readily transmit vibrations to the driver and passengers. This problem is aggravated by the limited space available for a seat suspension system in these vehicles. Furthermore, given the relatively lower cost of these vehicles and the limited space available in their passenger compartments, it is desirable that vehicle suspensions for these applications be economical and also capable of accomplishing their functions in a smaller space than was previously possible.

SUMMARY OF THE INVENTION

The present invention preserves the advantages of present vehicle seat suspension systems. It also provides new advantages not currently available and overcomes some of the disadvantages of prior art devices.

The invention is generally directed to an in-seat suspension system for a vehicle seat. The invention includes several unique structural features which permit the suspension to be contained completely within the dimensions of a normal seat in a light truck or recreational vehicle. These structural features require suspension of only the seat cushion, as opposed to the entire seat. The result is a simple but effective seat suspension which provides both shock absorption and damping if desired in a confined space with minimum height.

In the preferred embodiment, the present invention includes a frame comprised of U-shaped upper and lower tubes suitable for mounting to a vehicle. The frame supports a seat cushion made of any of a wide variety of available materials. The in-seat suspension includes a platform mounted within the frame and pivotally attached at one end to the front of the frame. Because the pivot point of the platform is located away from the center of the seat, a point on the platform near the center of the seat moves in a generally vertical path. Vibration is absorbed by resilient biasing means consisting of an air spring mounted between the platform and the seat frame. If necessary, damping of the in-seat suspension system is accomplished by a shock absorber also mounted between the platform and the frame.

The in-seat suspension includes means for compensating for the occupant's weight by adjusting the air pressure within the spring. The air pressure within the spring may also be changed to insure that when the seat is occupied, the platform is in a center position. Thus, regardless of the occupant's weight, equal and maximal travel of the platform in both upward and downward directions is insured.

The location of the pivot point at the front of the seat accomplishes one object of the invention by employing only one movable member to support the occupant of the seat, which in turn reduces the vertical dimension required to accommodate the suspension.

The location of the pivot point as far as possible from the center of the seat accomplishes two more objects of the invention. First it permits a reasonable range of vertical travel of the platform while yet containing the platform within the seat frame. Second, increasing the distance between the pivot point and the center of the platform makes the center point move on an arc which closely approximates a straight line.

DESCRIPTION OF THE DRAWINGS

The novel features believed to be characteristic of the present invention are set forth in the appended claims. The invention itself, however, together with further objects and attendant advantages, will be best understood by reference to the description taken in connection with the accompanying drawings in which:

DESCRIPTION OF THE PREFERRED EMBODIMENT

Figure 1:
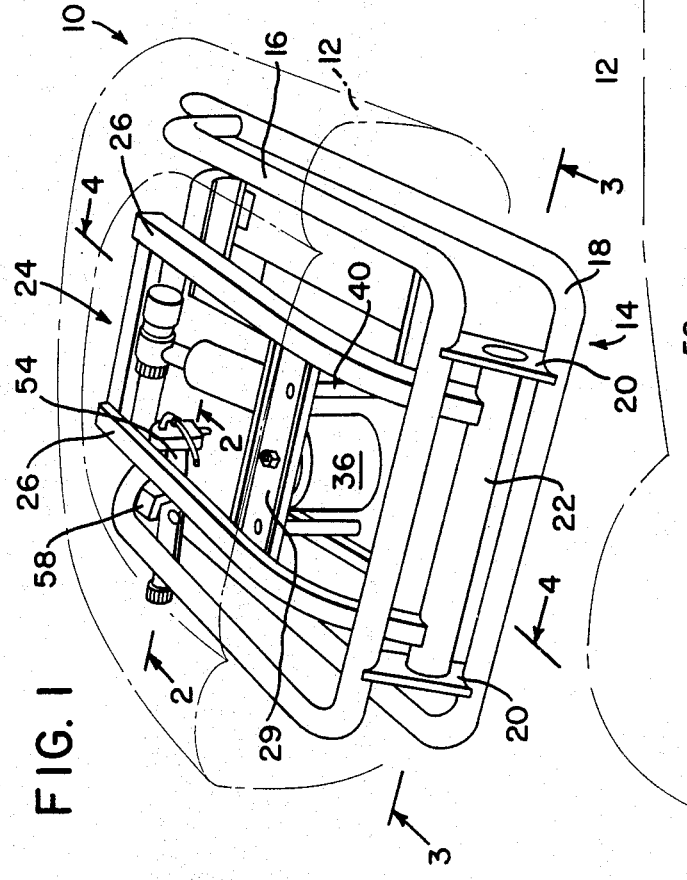
FIG. 1 is a perspective view of a vehicle seat incorporating the invention and showing a seat cushion in phantom.
Figure 4:
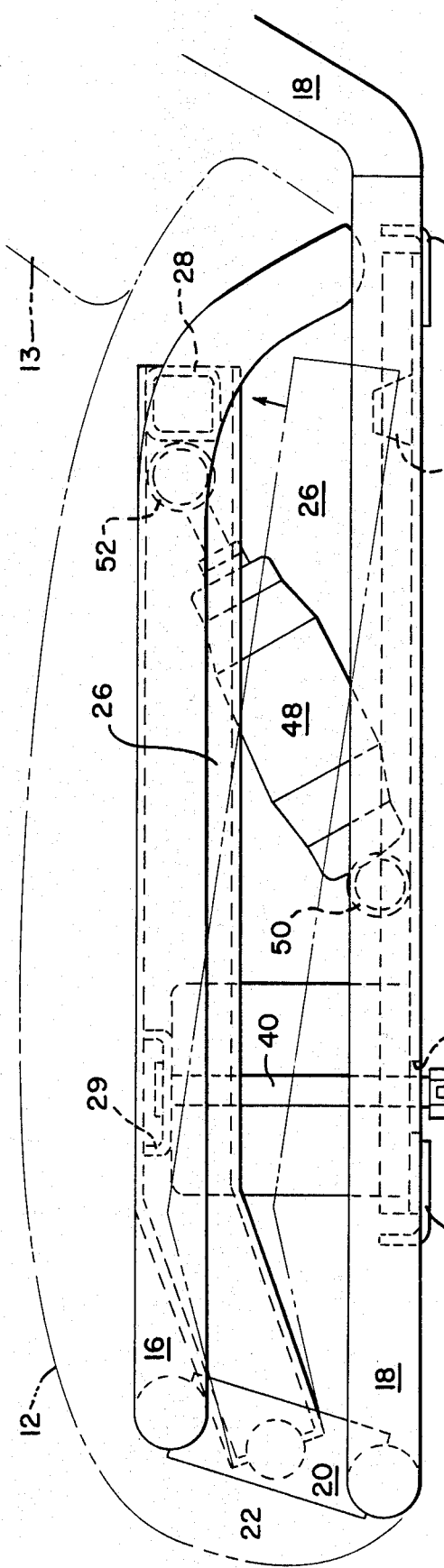
FIG. 4 is a sectional view taken along line 4—4 of FIG. 1 showing the air spring (in phantom) and an optional shock absorber for damping. The range of movement of the platform is shown by the two positions of the platform in FIG. 4, the lower position being in phantom.

The present invention may be employed with any suitable vehicle seat, designated generally at 10 in FIG. 1, such as those typically employed in light truck and recreational vehicles. The back rest is not shown. Seat 10 has a cushion 12 shown in phantom which is given shape and supported by frame 14 and a seat back 13 as shown in FIG. 4. Frame 14 is comprised of an upper U-shaped tube 16 and a lower U-shaped tube 18. Upper and lower tubes 16 and 18 are joined at the rear by weldment or any other suitable means. Tube 18 may be extended to support seat back 13, as shown in FIG. 4. At the front end of seat 10, upper and lower tubes 16 and 18 are connected by two vertical struts 20, each of which is attached at one end to upper tube 16 and at the other end to lower tube 18. A hub 22 is mounted between struts 20. Hub 22 is supported by an internal shaft and bearings which are not shown. The axis of rotation of hub 22 is parallel to the front portions of upper and lower tubes 16 and 18, as shown in FIG. 1.

Figure 5:
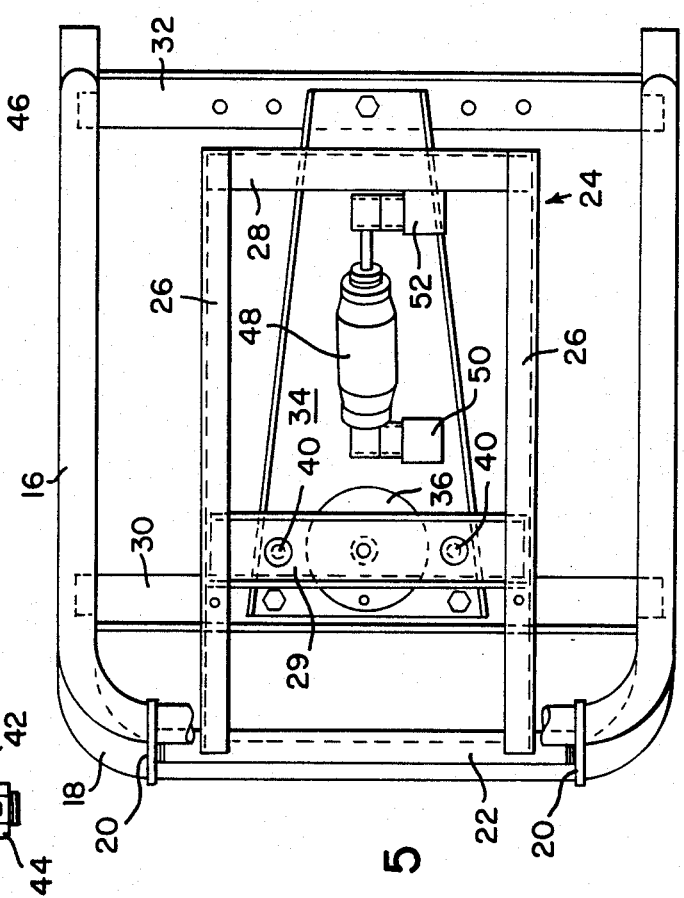
FIG. 5 is a plan view of the present invention with the air spring adjusting means deleted for clarity.
Figure 6:
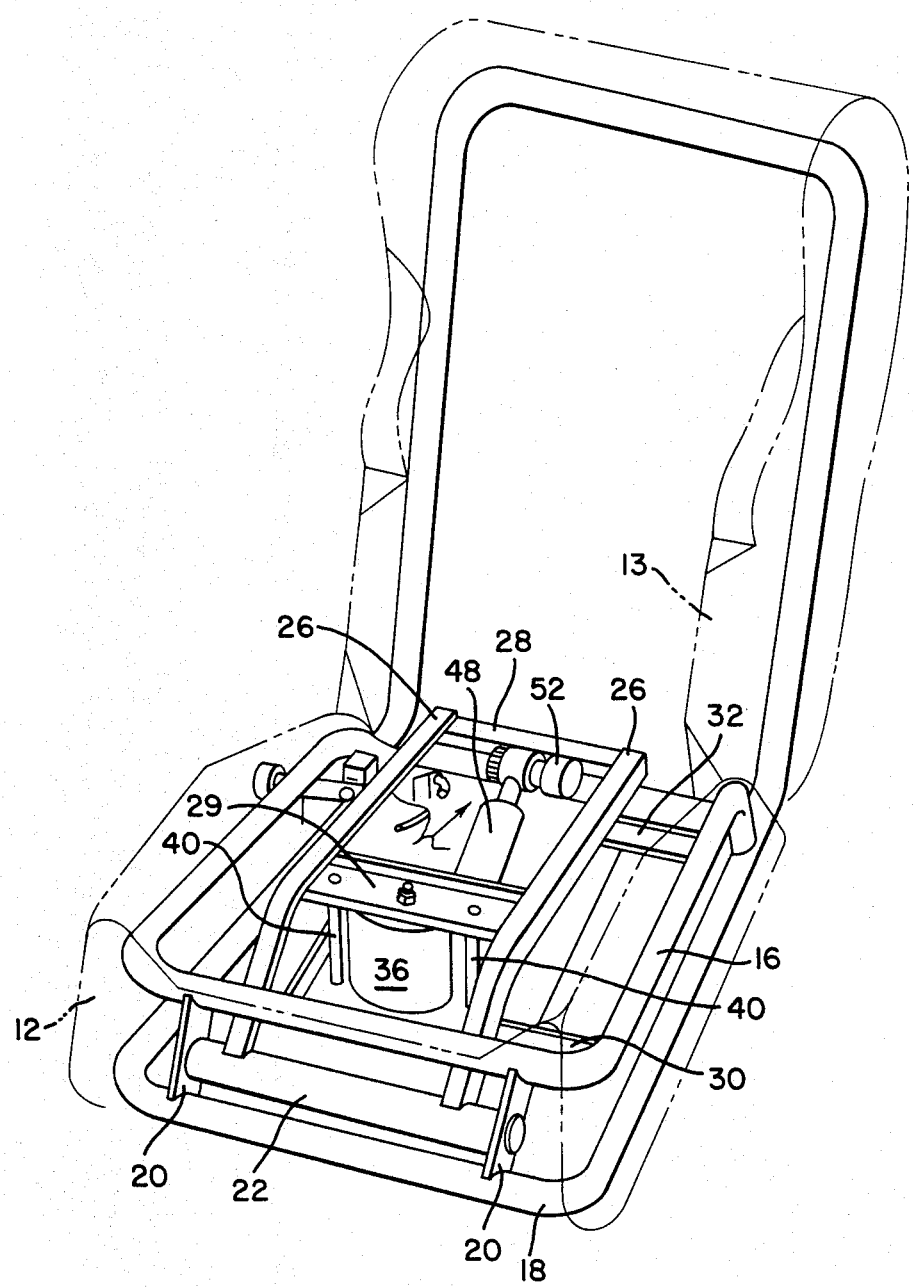
Figure 7:
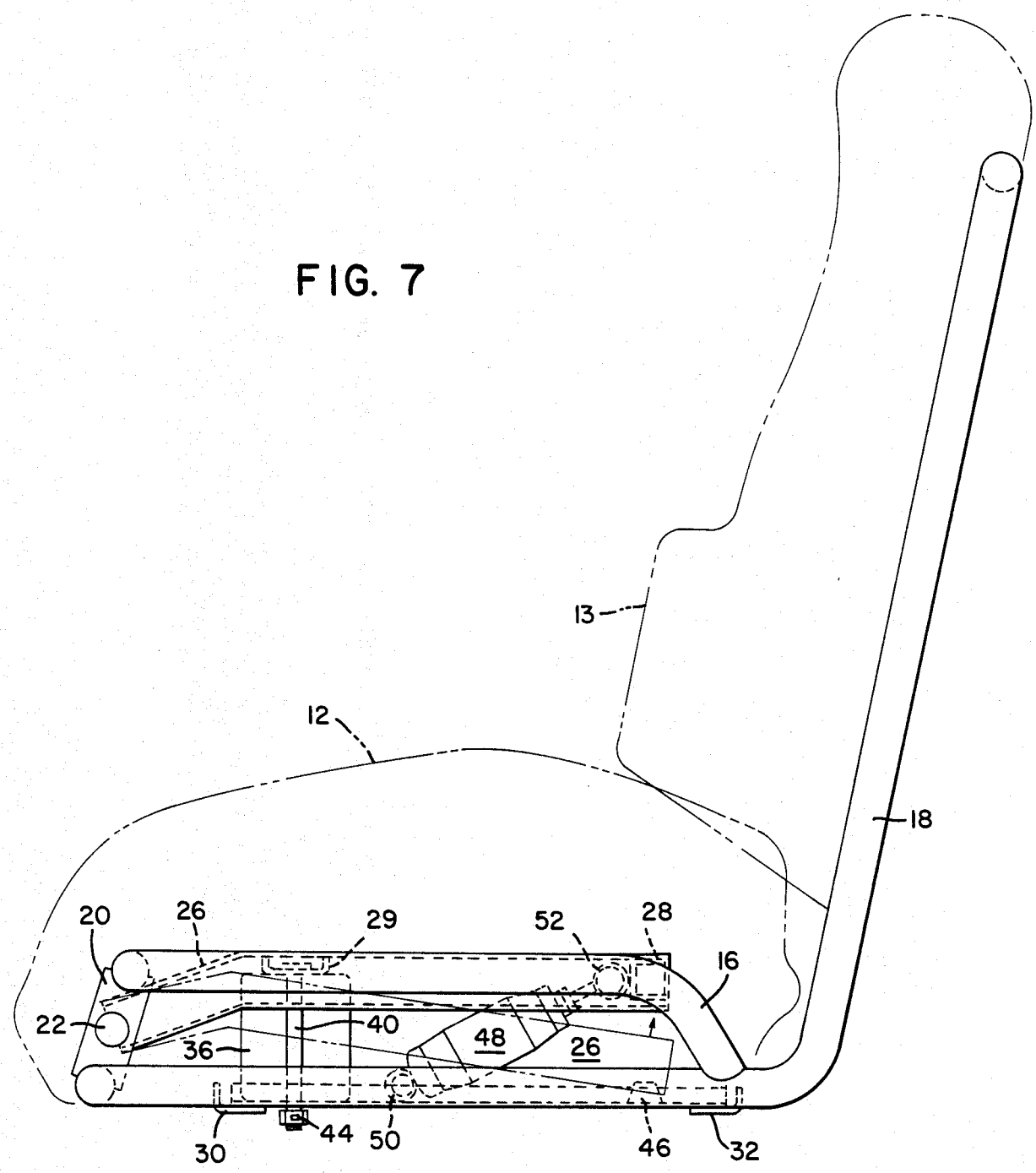

A platform 24 shown best in FIGS. 1 and 5 is comprised of two side members 26 and cross braces 28 and 29. Each side member 26 is parallel to the other and is attached at one end to hub 22. While platform 24 is hinged to the front of frame 14 in the preferred embodiment, it can also be hinged to either side or the rear of frame 14. Thus, platform 24 is able to move in a substantially vertical path as it rotates about pivot hub 22. This accomplishes two important objects of the invention. First, the moving member of the vehicle seat which provides substantial support to the seat occupant is pivoted about only one point, thus avoiding the parallelogram arrangements employed in the prior art. This minimizes the vertical dimension required for the seat suspension system, simplifies construction and reduces cost.

Second, the pivot point of the moving platform 24 is located as far as possible from the center position of the seat as viewed from above, shown in FIG. 5. As the distance between the pivot point and the center of the seat is increased, the range of travel of platform 24 is increased for a given angular rotation measured about pivot hub 22. Thus, a significant vertical displacement can occur in platform 24 and therefore the center of seat 10 while yet confining the moving platform 24 substantially within frame 14. Increasing the distance also makes the platform travel more nearly approximate a straight line, and minimizes horizontal movement of platform 24. As can be seen in FIG. 4, side members 26 are offset to insure that platform 24 remains within frame 14 throughout the full range of travel of platform 24 between the pivot point and seat center.

Two bottom braces 30 and 32 are attached laterally at the front and rear respectively of lower tube 18. Braces 30 and 32 strengthen seat 10 and provide points for attachment to a vehicle. As shown in FIG. 5, a truncated triangular base plate 34 is attached by any suitable means between braces 30 and 32. Platform 24 is resiliently biased by an air spring 36 mounted on the upper surface of base plate 34. The top of air spring 36 is attached to platform 24 via cross brace 29. Thus, air spring 36 absorbs energy imparted to the suspension system via either frame 14 or platform 24, thereby cushioning the seat occupant.

Platform 24 is limited in its upward travel by limit bolts 40 shown best in FIGS. 1 and 4. Each bolt 40 is rigidly attached to cross braces 29. The lower end of each bolt 40 passes through an elongated slot 42 in base plate 34. A nut 44 is threaded onto each bolt 40. As platform 24 move up and down, elongated slots 42 prevent contact or binding between bolts 40 and base plate 34. When platform 24 reaches the desired upward limit, nuts 44 interfere with base 34 restraining platform 24 from further upward travel. Bolts 40 are as close as possible to pivot hub 22. Consequently, their movement is substantially less than the maximum travel of platform 24, avoiding interference between bolts 40 and the structure on which seat 10 is mounted.

Limitation of downward travel of platform 24 is accomplished by a rubber bumper 46 attached to base plate 34 at the rear end of platform 24. Travel of platform 34 to its lower limit causes brace 28 to strike bumper 46, thus preventing further travel of platform 24 in the downward direction.

In necessary for the particular application, damping of the suspension system is accomplished by a shock absorber 48 shown best in FIG. 4. Shock absorber 48 is pivotally attached via projections 50 and 52 shown in FIG. 5. Projection 50 is attached to base plate 34. Projection 52 is attached to brace 28. As platform 24 moves with respect to frame 14, shock absorber 48 is extended or compressed, and damps platform movement. This accomplishes another object of the invention, which is to provide damping using minimum space in the vertical direction.

Figure 2:
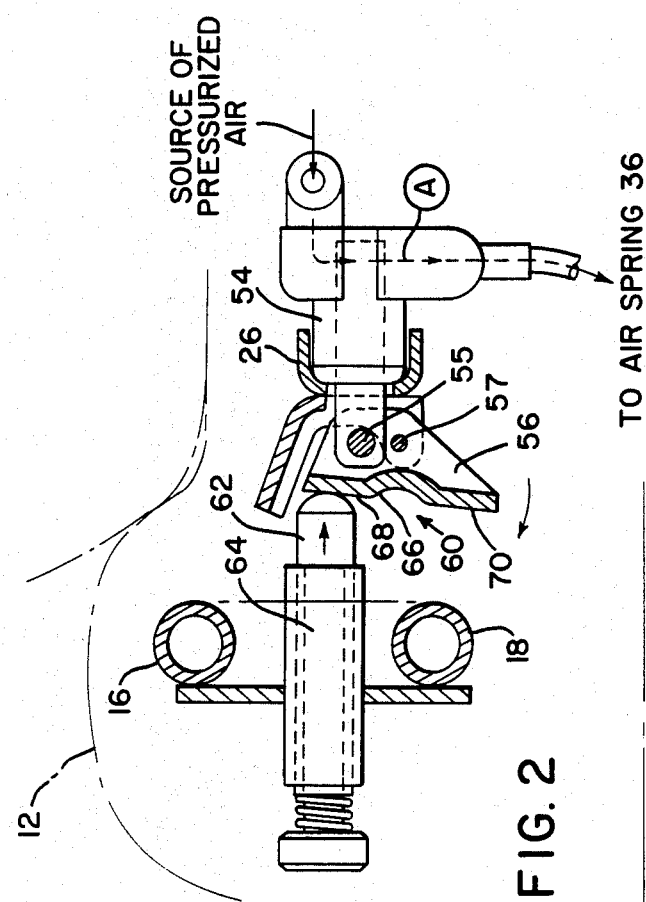
FIG. 2 is a partial sectional view taken along line 2—2 of FIG. 1 and showing the means for centering the movable portion of the suspension to accommodate occupants of different weights; the seat cushion is again shown in phantom.
Figure 3:
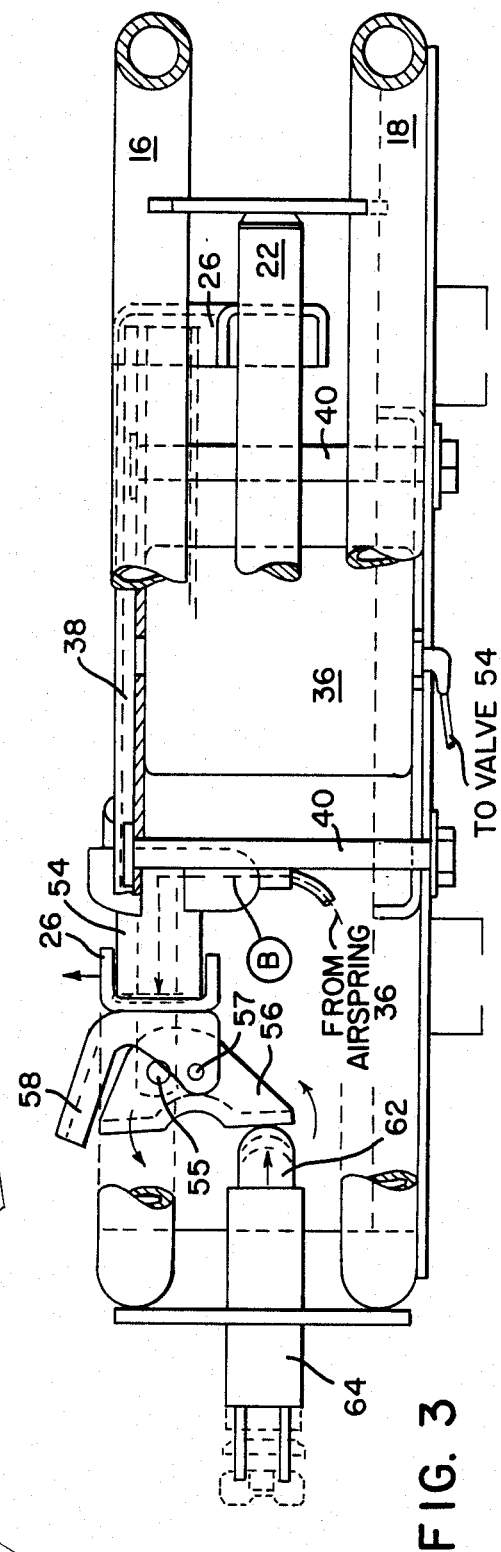
FIG. 3 is a sectional view taken along line 3—3 of FIG. 1 with portions broken away for clarity and showing an air spring which provides shock absorption.

Seat 10 is also equipped with means to insure that platform 24 is centered within its range of travel inside frame 14. Otherwise, vehicle occupants of different weights would cause platform 24 to be displaced from its center position, thus permitting disproportionate travel in one direction or the other, depending on occupant weight. Air spring 36 contains air at a pressure above atmosphere. When seat 10 is unoccupied, air spring 36 will cause platform 24 to move to its upper limit. When seat 10 is occupied, platform 24 moves down until the occupant's weight is balanced by the pressure in air spring 36. If platform 24 comes to rest in its mid-position, equal suspension travel is allowed both upwardly and downwardly. However, a lighter than average occupant would allow platform 24 to remain above its mid-position, thus unnecessarily limiting its upward travel. On the other hand, a heavier than average occupant would produce the opposite effect. The adjusting means allows variation of air pressure inside air spring 36, thus accommodating seat occupants of different weights. The adjusting means is best shown in FIGS. 2 and 3, and includes a valve 54 mounted on a side member 26 of platform 24. Valve 54 operates three ways, that is, it isolates air spring 36, thus maintaining the pressure inside the air spring at a given value. Alternatively, valve 54 can connect air spring 36 either to a supply of high pressure air in order to increase the internal spring pressure or to atmosphere in order to vent air spring 36, thus decreasing the internal pressure.

A wedge-shaped link 56 is pivotally attached to valve 54 via pin 55. Link 56 is also pivotally attached by pin 57 to bracket 58 mounted on side member 26. The pivotal attachment of link 56 to bracket 58 is below the attachment of link 56 to valve 54. Link 56 has a shaped surface 60 for engagement with a spring loaded plunger 62 slidably mounted in a tube 64 attached to a flange between upper and lower U-shaped tubes 16 and 18. Plunger 62 is biased by a spring to prevent engagement with shaped surface 60, unless plunger 62 is manually depressed by the occupant. Shaped surface 60 has an indented central portion 66. When platform 24 is in its center position, plunger 62, if depressed, will align with indented portion 66. Link 56 will not rotate. Consequently, valve 54 will not be actuated and air spring 36 will remain isolated, maintaining the pressure within air spring 36 at a constant value. Should a heavy occupant sit in seat 10 and depress platform 24 with respect to frame 14 below the centered position, platform 24 may be restored to its center position by depressing plunger 62 which will engage a sloped upper portion 68 of surface 60. The resulting rotation of link 56, and the relative positions of the pivotal attachments of link 56 will cause valve 54 to open air spring 36 to a source of high pressure air (see arrow A), thus increasing the pressure within air spring 36 and returning the platform to its center position. As platform 24 approaches its center position, plunger 62 will again align with indented portion 66, shutting the valve and isolating air spring 36. Should a lighter than average occupant rest in the seat, platform 24 may be centered by a similar process, that is, depressing plunger 62 will press against a sloped, lower portion 70 of shaped surface 60, thus causing valve 54 to vent air spring 36 to atmosphere, see arrow B, lowering platform 24 to its center position. The adjusting means thus accomplishes a third important object of the present invention, which is to insure that the movable platform 24 of seat 10 supporting an occupant is centered regardless of the weight of the occupant. When centered, platfor 24 has equal travel in each direction and is best able to accomplish its function of absorbing shocks without transmitting them has equal travel in each direction and is best able to accomplish its function of absorbing shocks without transmitting them to the occupant.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A vehicle seat suspension apparatus, comprising:
   a frame including rigidly connected upper and lower structural members;
   a platform contained within the frame and hinged at one end to a side of the frame to allow limited rotation of the platform in a generally vertical arc contained within the frame; and
   means attached between the frame and platform and contained within the frame for resiliently biasing the platform within the frame in response to a force exerted on the platform.

2. The vehicle seat suspension apparatus of claim 1 wherein the resilient biasing means comprises:
   an air spring mounted between the platform and the frame; and
   means for varying air pressure in the air spring proportionately to a downward force on the platform.

3. The vehicle seat suspension apparatus of claim 2, wherein the means for varying air pressure comprises:
   valve means mounted on the platform controlling the flow of air into and out of the air spring;
   a link pivotally attached to the platform and the valve;
   a plunger mounted on the frame and in operative contact with the link; and a source of pressurized air operatively connected to the valve means.

4. The vehicle seat suspension apparatus of claim 3, wherein the link further includes a surface in contact with an end of the plunger, with the pivot point of the link on the valve being located above the pivot point of the link on the platform, the surface having:
   an indented portion for receiving the plunger when the platform is in its center position with respect to the frame;
   an angled portion above the indentation for interfering with the plunger to rotate the link to connect the air supply to the air spring; and
   an angled portion below the indentation for interfering with the plunger to rotate the link to connect the air spring to the atmosphere.

5. The vehicle seat suspension apparatus of claim 1 further including a shock absorber attached between the frame and platform.

6. A vehicle seat suspension apparatus comprising:
   a first member suitable for mounting on a vehicle, and having upper and lower tubes connected by vertical struts;
   a second member surrounded by, and movably attached at one end to, the first member and moveable at the opposite end with respect the first member through a generally vertical arc contained within the first member;
   resilient biasing means for maintaining the second member within a range of movement with respect to the first member in response to a force on the second member; and
   adjusting means for altering the resilience of the resilient biasing means.

7. The vehicle seat suspension apparatus of claim 6 wherein the resilient biasing means comprises an air spring mounted between the first member and second member.

8. The vehicle seat suspension apparatus of claim 7 wherein the adjusting means comprises:
   a valve mounted on the second member for controlling the flow of air into and out of the air spring;
   an air supply connected to the valve; and
   means for operating the valve to vary the air pressure in the air spring.

9. The vehicle seat suspension apparatus of claim 8 wherein the means for operating the valve comprises:
   a plunger mounted on the first member; and
   a link pivotally attached to the valve and also pivotally attached to the second member at a point below its pivotal attachment to the valve, the link further having an upper sloped surface which engages the plunger to connect the air spring to the air supply when the second member is below its center position, and a lower sloped surface which engages the plunger to connect the air spring to atmosphere when the second member is above its center position.

10. The vehicle seat suspension apparatus of claim 9 further including a shock absorber mounted between the first and second members.

11. A vehicle seat suspension apparatus comprising:
    a rigid frame having upper and lower members, said frame being suitable for mounting in a vehicle;
    a platform hinged at one end to an inner side of the frame at a maximum distance from the center of said frame and enclosed by a seat cushion covering the frame;
    an air spring within the frame and attached to both the frame and platform;
    a valve operatively connected both to the air spring, and to a supply of air at greater than atmospheric pressure; and
    means for releasing air from the air spring.

* * * * *